(12) United States Patent
Collier-DeChristopher et al.

(10) Patent No.: US 9,402,345 B2
(45) Date of Patent: Aug. 2, 2016

(54) COTTON HARVESTER

(71) Applicant: CNH Industrial America LLC, New Holland, PA (US)

(72) Inventors: Alexandra C. Collier-DeChristopher, Lancaster, PA (US); Kevin S. Richman, Plainfield, IL (US); Michael J. Minnich, Elizabethtown, PA (US); Geoffrey Rendell, Baulkham Hills (AU); Donald Keller, Narvon, PA (US); Christopher D. Sellers, Hazlehurst, GA (US); Jesse H. Orsborn, Warsaw, MO (US)

(73) Assignee: CNH Industrial America LLC, New Holland, PA (US)

( * ) Notice: Subject to any disclaimer, the term of this patent is extended or adjusted under 35 U.S.C. 154(b) by 33 days.

(21) Appl. No.: 14/338,911

(22) Filed: Jul. 23, 2014

(65) Prior Publication Data

US 2016/0021822 A1    Jan. 28, 2016

(51) Int. Cl.
*A01D 46/16*    (2006.01)
*A01D 46/08*    (2006.01)

(52) U.S. Cl.
CPC ............... *A01D 46/16* (2013.01); *A01D 46/08* (2013.01)

(58) Field of Classification Search
CPC ............... A01D 46/08–46/088; A01D 46/00; A01D 46/10–46/18
See application file for complete search history.

(56) References Cited

U.S. PATENT DOCUMENTS

| | | | | |
|---|---|---|---|---|
| 779,965 | A * | 1/1905 | Purnell | A01D 46/10 290/1 R |
| 1,689,443 | A | 10/1928 | MacGregor | |
| 1,833,001 | A | 11/1931 | Smith | |
| 3,533,224 | A | 10/1970 | Keck | |
| 3,651,624 | A * | 3/1972 | Bandemer | A01D 46/08 56/13.3 |
| 3,757,502 | A * | 9/1973 | Hubbard | A01D 46/08 56/13.3 |
| 6,205,756 | B1 * | 3/2001 | Orsborn | A01D 46/08 56/30 |
| 7,681,386 | B1 | 3/2010 | Lunsford et al. | |

* cited by examiner

*Primary Examiner* — Alicia Torres
*Assistant Examiner* — Adam Behrens
(74) *Attorney, Agent, or Firm* — Patrick M. Sheldrake

(57) ABSTRACT

A cotton harvester includes plant cutting apparatus to sever cotton plants from a ground surface, plant conveyor apparatus to convey the severed plants into and through a picking chamber, and cotton picking apparatus including picker spindles that move upwardly into the picking chamber through a floor of the chamber to pick cotton filaments from bolls of the plants conveyed as a flattened mat therethrough and carry the cotton downwardly through the floor to doffers that remove the cotton from the spindles. Cotton conveyor apparatus also below the floor conveys the cotton to a receiver, while the plant residue passes from the chamber.

20 Claims, 7 Drawing Sheets

COTTON HARVESTER

TECHNICAL FIELD

This invention relates generally to a cotton harvester, and more particularly utilizing row insensitive plant cutting apparatus to sever cotton plants from a ground surface, plant conveyor apparatus to convey the severed plants into and through a picking chamber, and cotton picking apparatus including picker spindles configured to move upwardly into the picking chamber from a floor of the chamber to pick cotton from the plants conveyed therethrough and carry the cotton downwardly through the floor to doffers that remove the cotton from the spindles. Cotton conveyor apparatus below the picking chamber conveys the removed cotton to a receiver, while the plant residue passes from the chamber.

BACKGROUND ART

It is well known and successful to harvest cotton from standing rows of plants using upstanding drum type picker units with moving, rotating spindles or fingers that remove the cotton from the bolls of the plants. The cotton is then removed from the spindles using a doffer system, and the cotton is collected. Reference in this regard, Thedford et al., U.S. Pat. No. 5,038,552 issued Aug. 13, 1991.

It is also well known to harvest cotton in a row insensitive manner by cutting entire plants and feeding them into an area of the harvester in which the bolls are removed from the plants using drum mounted rotating spindles. The drums can be vertical, as disclosed in Keck, U.S. Pat. No. 3,533,224 issued Oct. 13, 1970, wherein the cut plants are fed between the spindle drums. The drums can also be horizontal, disposed above the cut crops so as move in the direction of travel of the plants, for both picking the cotton from above and propelling the movement of the plants through the picking area. Reference in this regard, Hubbard, U.S. Pat. No. 3,757,502 issued Sep. 11, 1973. This can be disadvantageous, as the plants are not attached to the ground or otherwise fixed in position, and thus there is nothing holding the bolls to allow the cotton filaments to be pulled therefrom. Instead, the bolls are moving in the same direction as the spindles and the rotary movement of the spindles may be the only relative movement for pulling the filaments from the bolls, and this may not be adequate as the bolls, because the plants are cut from the ground, are free to rotate with the spindles. Another possible disadvantage is that the doffers and pneumatic duct system are arranged such that the doffed cotton must overcome gravity when traveling from the doffers to the duct inlet for collection, and if not collected will fall either to collect in the enclosure containing the drums or fall back into the plant flow and be lost.

Still other known cotton harvesters utilize transverse horizontal picking drums that have spindles which reach into standing plants and snag the cotton bolls to remove them from the plants. However, this requires doffing the bolls from the spindles and the additional step of removing and separating the cotton from the loose bolls.

In recent years, picking cotton from standing rows of plants in a row sensitive manner using harvesters with upstanding drums has been more prevalent, at least in the United States. However, this manner of picking has been found to have shortcomings productivity- and time-wise. A reason for this is that most efficient picking from standing plants occurs with the picker drum speeds synchronized to move at the ground speed of the machine. If it is attempted to increase picker drum speed with increased ground speed, drum life can be significantly decreased and service requirements significantly increased. Increasing drum speed also decreases efficiency, so that a lower percentage of the cotton may actually be harvested. It is still sought to increase picking speed, however, as cotton has a short harvest window in which the cotton, defoliation of the plants, and weather are optimal for harvesting. It is also desired by some to have an improved row insensitive cotton harvesting capability.

Thus, what is sought is a manner of increasing cotton picking speed to enable taking advantage of optimal conditions, that overcomes one or more of the shortcomings and limitations set forth above, and has an improved row insensitive harvesting capability.

SUMMARY OF THE INVENTION

What is disclosed is a cotton harvester that enables increasing picking speed to enable taking advantage of optimal conditions, that overcomes one or more of the shortcomings and limitations, set forth above, and provides a row insensitive capability.

According to a preferred aspect of the invention, the cotton harvester has cutting apparatus for severing cotton plants from the ground, in a row insensitive manner, and plant conveyor apparatus for conveying the severed plants into and through a picking chamber. The harvester includes picking apparatus including a plurality of spindles configured and operable to move into the picking chamber and pick cotton filaments from bolls of the plants conveyed through the picking chamber, and carry the picked cotton into another area of the harvester. The other area is preferably located below the picking chamber, and includes doffers configured to remove the cotton from the spindles.

According to another preferred aspect of the invention, the surface bounding and enclosing the lower periphery of the picking chamber comprises a floor thereof, and the spindles extend upwardly through slots therein. The conveyor apparatus and the surface bounding and enclosing the lower periphery of the picking chamber, e.g., the floor, define a height of the chamber therebetween, and at least some of the spindles have a vertical extent within some portion the chamber only marginally smaller than the height of the chamber.

This provides a capability to pick cotton throughout the height of the chamber. The conveyor apparatus and the surface bounding and enclosing the lower periphery of the picking chamber are preferably configured and operable to flatten and maintain the plants in a mat when conveyed therethrough. To facilitate the conveyance of the plants, the conveyor can have features such as ribs, slats, a texture, etc. for grasping and moving the plant.

According to another preferred aspect of the invention, the slots are transverse to a direction of movement of the severed plants through the picking chamber, such that the spindles will move transversely through the severed plants. As a result, conveying and compacting of the plants over the floor through the picking chamber is effected by the conveyor apparatus, while an effective cross raking and removal of cotton from the mat is effected by the spindles. These separate actions provide relative motion between the spindles and the bolls to allow the spindles to better pull the cotton filaments from the bolls. Because the slots cross the direction of plant flow, there is less likelihood of plants being caught, gathering in, or passing through the slots. And because the cotton is carried downwardly through the slots by the spindles, this is assisted by gravity, and there is a reduced likelihood of loss with the plant residue.

As another preferred aspect, the spindles are carried on at least one drum disposed below the picking chamber, rotatable about a rotational axis through the drum. The rotational axis is preferably oriented in or at a small angle to the direction of flow of the plants through the picking chamber, and the spindles are preferably individually rotated through axes therethrough, respectively, in the conventional manner, for winding the cotton thereabout as the cotton is removed from the bolls in the picking chamber. Preferably also, at least two of the drums are provided, in side by side relation.

As another preferred aspect of the invention, doffers are located below the picking chamber in or associated with at least one cotton collecting chamber, and are configured to remove the cotton from the spindles in the well known manner. Cotton conveyor apparatus in or associated with the cotton collecting chamber or chambers, is operable to convey the removed cotton to a receiver, while the plant residue passes above from the picking chamber.

As an alternative arrangement, the drums can be oriented so as to extend transverse to the direction of conveyance of the plants through the picking chamber, and the spindles moved through the plant flow mat in a manner to advantageously pick the cotton from the bolls. Because separate conveying apparatus is used, a relative motion between the bolls and the spindles is created to better extract the cotton from the bolls.

DETAILED DESCRIPTION OF THE INVENTION

Figure 1:
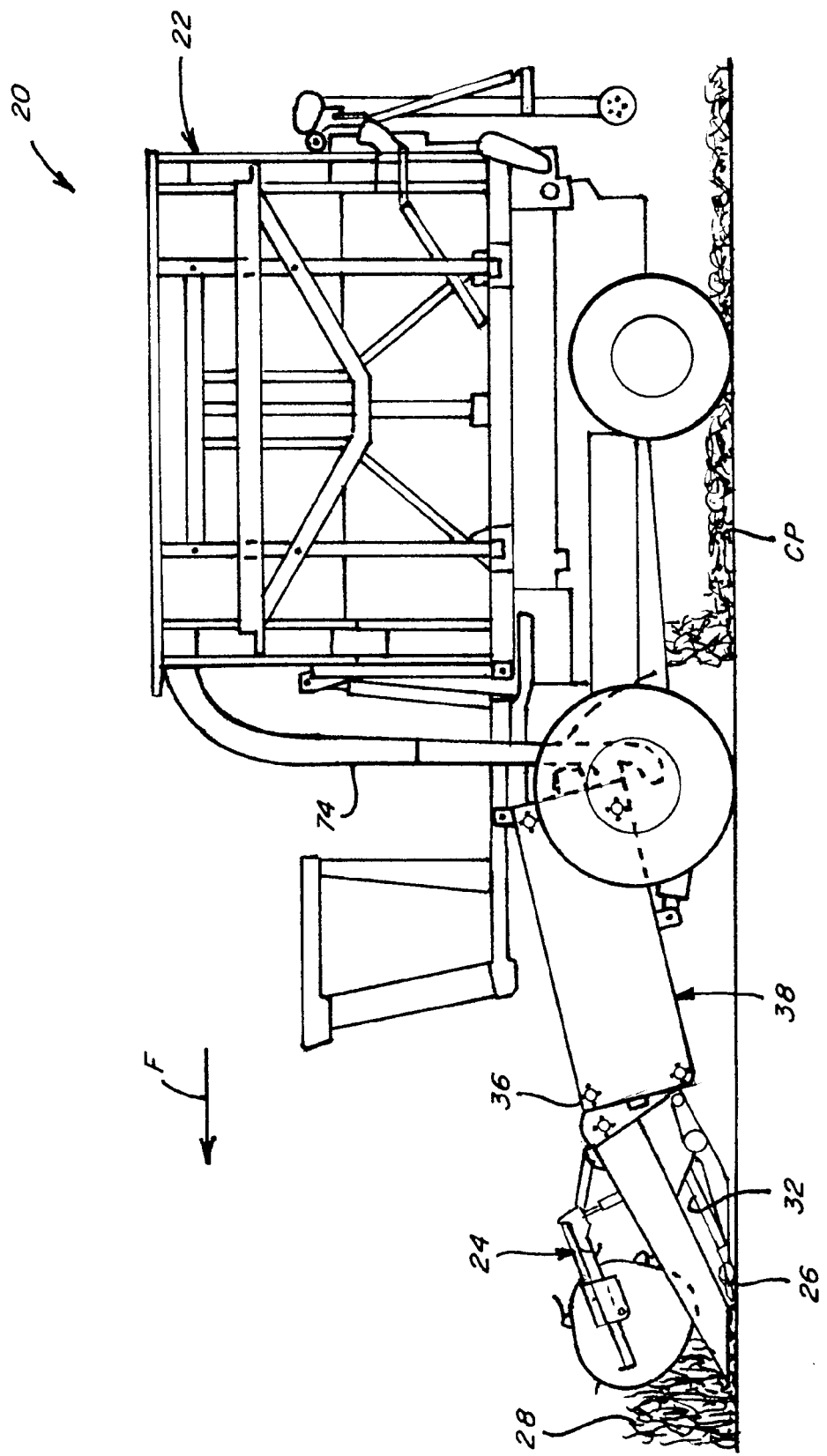
FIG. 1 is a side view of a cotton harvester, constructed and operable according to the teachings of the present invention.
Figure 2:
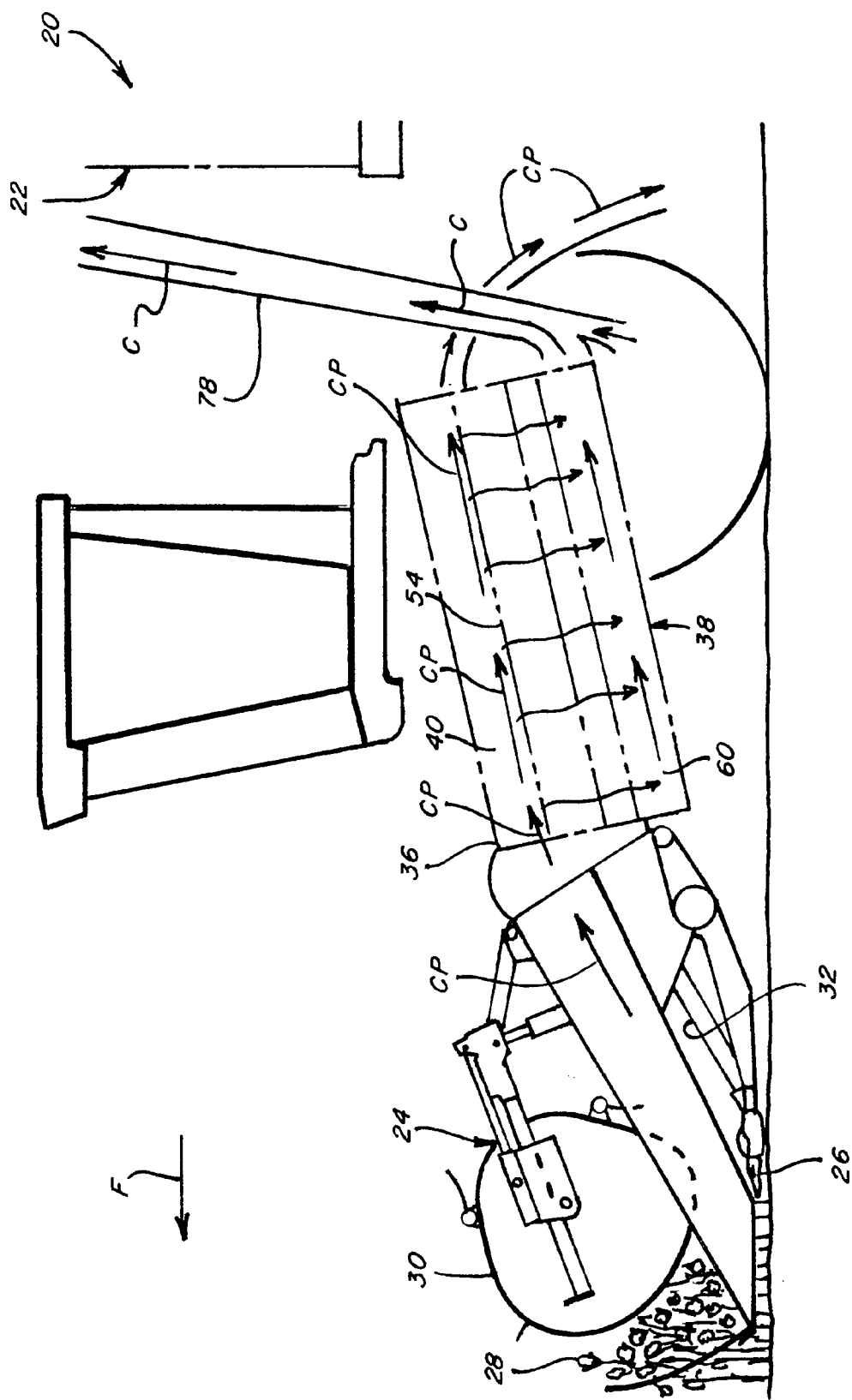
FIG. 2 is a fragmentary simplified schematic side view of the harvester, shown cutting cotton plants from the ground, and with arrows, operation of aspects of the invention.
Figure 3:
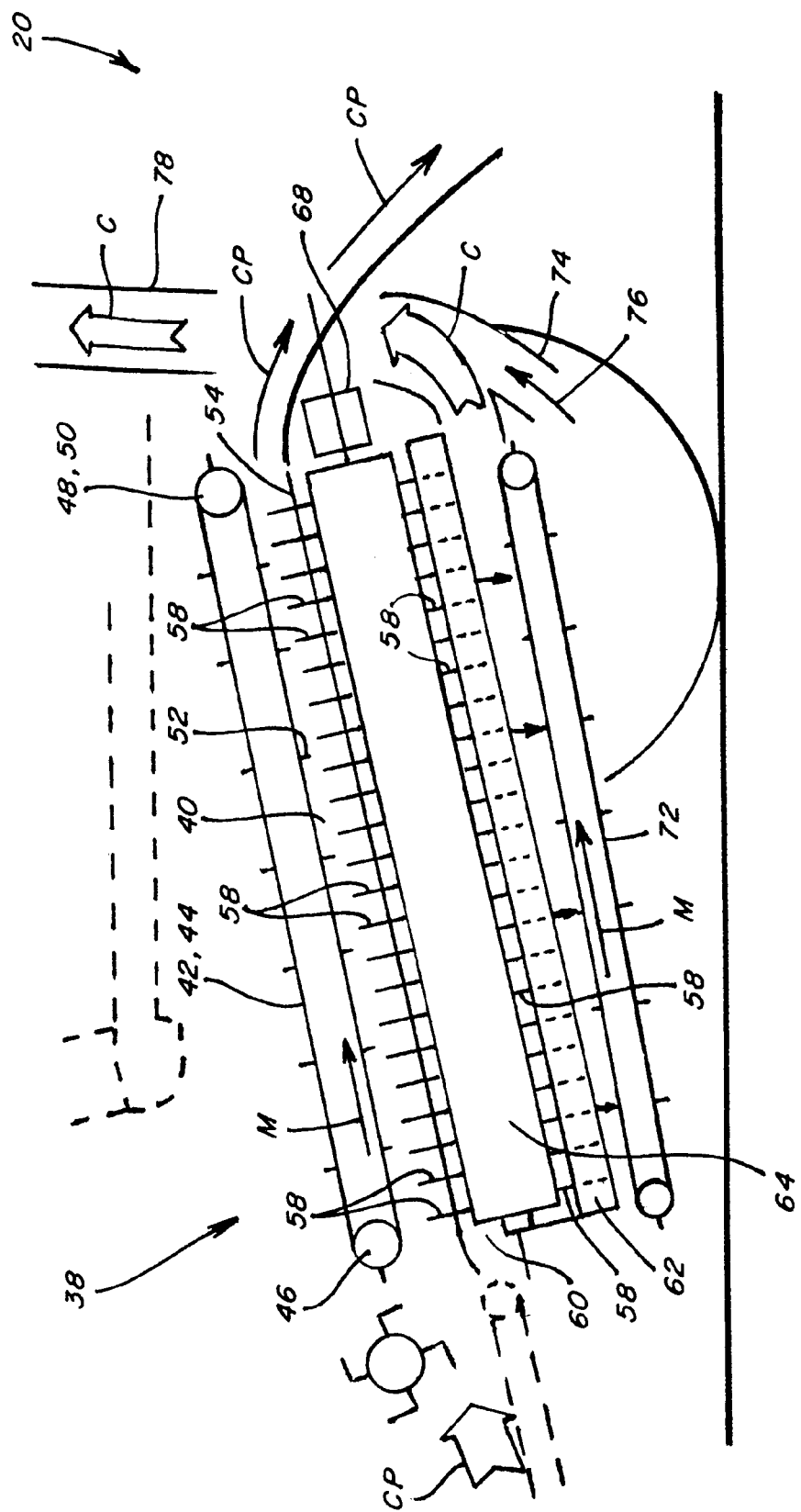
FIG. 3 is another fragmentary simplified schematic side view of the harvester, illustrating operation of cotton picking and conveying apparatus thereof using arrows.
Figure 4:
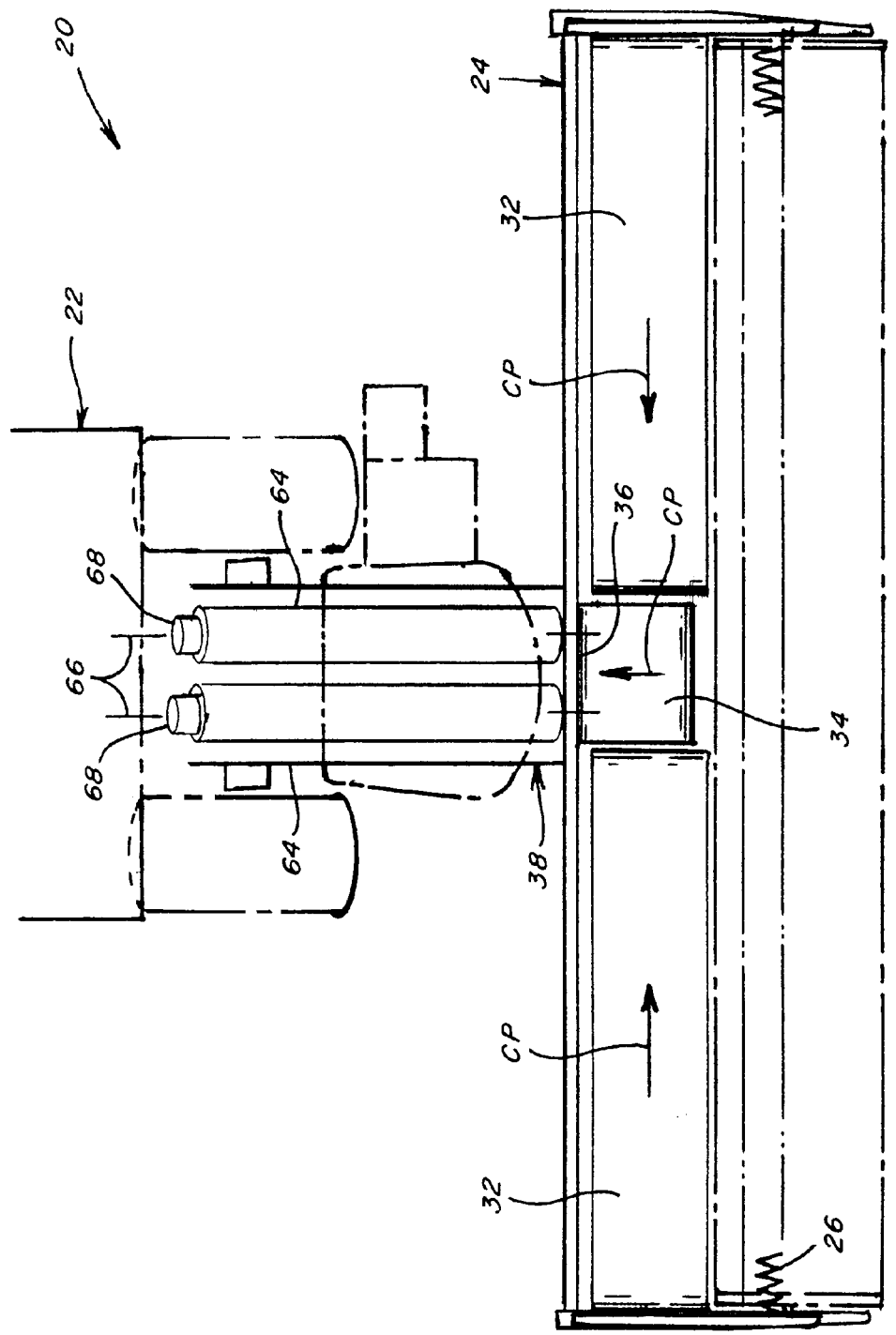
FIG. 4 is a fragmentary simplified schematic top view of the harvester, showing with arrows operation of cotton picking and conveying apparatus.

Referring now to the drawings, in FIGS. 1 through 4, a representative self-propelled mobile cotton harvester 20 is shown. Harvester 20 generally includes a conventionally constructed and operable engine and drive train (not shown) for propelling it, and for powering the various systems thereof, including a cotton compacting system including a module builder 22 for building a cotton module from cotton as it is harvested by harvester 20. Although a self-propelled harvester 20 is shown, the invention described herein can be incorporated into a variety of harvester constructions, or can be towed or pushed, e.g., using a tractor, and the cotton collected as desired using an accompanying basket, wagon, or the like.

Harvester 20 includes a header 24 on a front end thereof, including row insensitive plant cutting apparatus 26, which here comprises an elongate sidewardly extending sickle cutter having a row of knife sections reciprocatingly movable sidewardly relative to fixed guards, for severing standing plants 28, which here are cotton plants, from the ground as harvester 20 moves forwardly therealong, as denoted by arrow F. Header 24 includes a rotary reel 30 operable in cooperation with plant cutting apparatus 26, for orienting and holding the plants for cutting. The cut plants then fall onto draper belts 32 extending sidewardly across a floor of header 24, and are conveyed thereby to a center belt 34 that conveys the cut plants into a mouth or open inlet end of a feeder house 38 on which header 24 is supported, as denoted by arrows CP.

This sequence, and the construction and operation of header 24 is typical of non-row sensitive agricultural grain type headers of a variety of constructions available from a variety of manufacturers, and thus is not intended to be limiting. As a non-limiting example of an alternative cutting apparatus for header 24, well known rotary disk type cutters could be used. As a non-limiting alternative conveying apparatus, an auger type conveyor or conveyors could be used.

Feeder house 38 defines and bounds a picking chamber 40 which cut plants CP enter through inlet end 36. Feeder house 38 includes plant conveying apparatus 42 bounding and enclosing an upper periphery of chamber 40, here preferably comprising an endless belt 44 encircling a roller 46 and a drive roller 48. Drive roller 48 is suitably rotatably driven by a drive 50, that can comprise, for instance, a suitable hydraulic drive motor, electric drive motor, a belt, chain, or shaft drive, as desired or required, for moving a lower feed surface of belt 44 rearwardly through chamber 40, as denoted by arrows M. Belt 44 can include features 52, as desired or required, suitable for engaging and propelling cotton plants conveyed to inlet end 36 by center belt 34, rearwardly through chamber 40. As non-limiting examples, features 52 can include ribs, slats, raised elements, etc.

Figure 6:
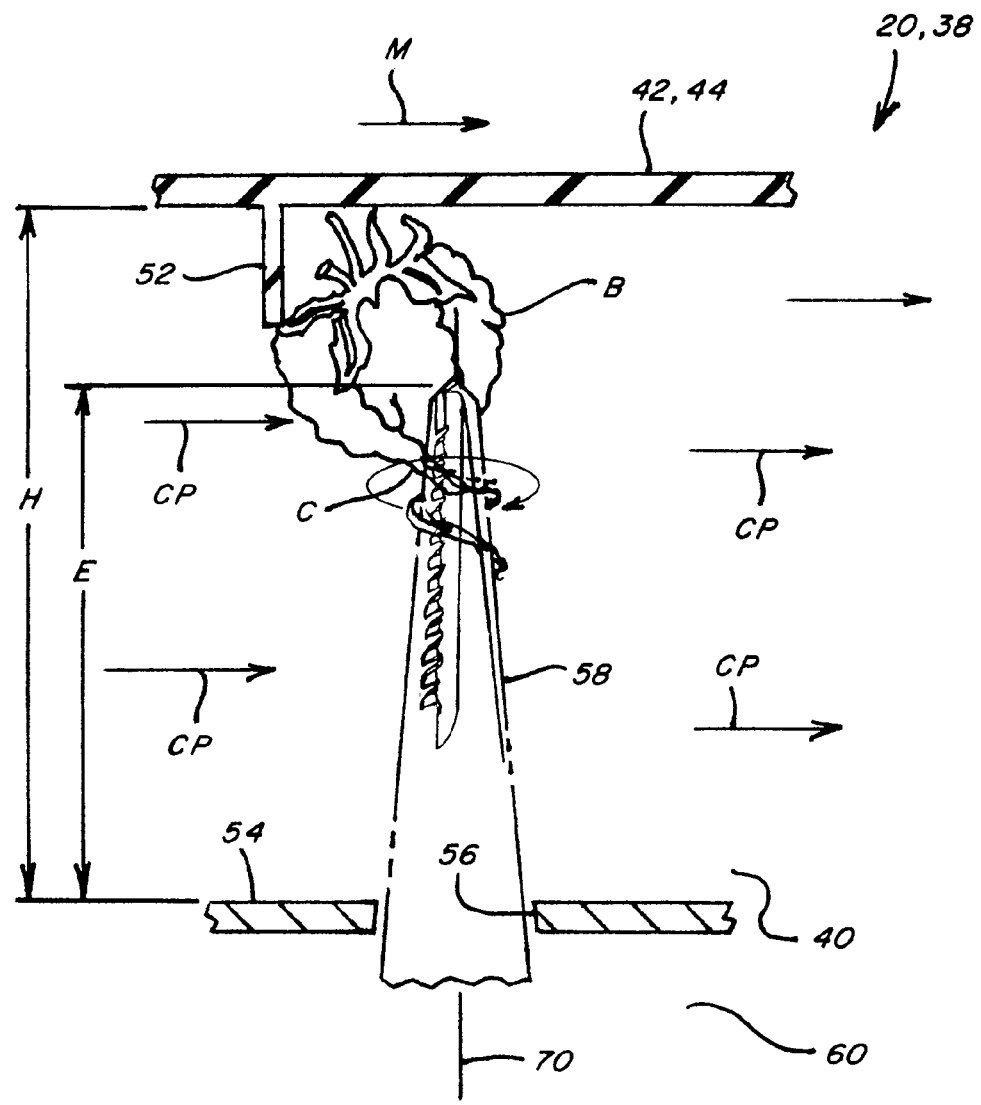
FIG. 6 is a sectional view showing a spindle extending through a floor of the picking chamber, and illustrating with arrows, conveyor operation, plant flow and rotation of the spindle.

Feeder house 38 includes a floor 54 bounding and enclosing a lower periphery of chamber 40. Belt 44 and floor 54 are spaced a predetermined distance apart which defines the height H of chamber 40, as illustrated in FIG. 6. This serves to contain and control the height or thickness of the flow of cut plants CP therethrough, so as to be compacted or compressed into a mat in a manner to be efficiently and effectively conveyed, and which still allows cotton filaments to be pulled or withdrawn from bolls. To enable the picking action in cooperation with the conveying movement in an efficient and effective manner, floor 54 includes elongate slots 56 extending sidewardly thereacross, at fore and aft spaced locations therealong. A plurality of elongate cotton picking spindles 58 extend upwardly through slots 56, configured and operable to move through slots 56 across picking chamber 40 to pick cotton filaments C from bolls B of the cut plants CP conveyed therethrough, and to carry the picked cotton C into another area of the harvester. Here, The other area preferably comprises a cotton collecting chamber 60 disposed below floor 54. Chamber 60 includes doffers 62 configured and operable to remove the cotton from spindles 58.

At least some of spindles 58 have a vertical extent E within some portion picking chamber 40 only marginally smaller than the height H of the chamber, as illustrated in FIG. 6, to provides a capability to reach bolls B, or a stem or branch to which the individual bolls are attached, at substantially any location within chamber 40. In particular in this regard, because bolls B are still attached to their individual cut plants CP, engagement of spindles 58 with branches and stalks carrying bolls B while moving across or transverse to chamber 40 will have a tendency to pull the bolls B toward the spindles 58 in a manner to bring the spindles into contact with the cotton filaments projecting from the opened bolls. Individual spindles 58 are preferably conventionally configured and operable to rotate about a longitudinal axis therethrough and include barbs or other features configured to grasp and hold cotton filaments extending from a boll in a manner to draw or pull the filaments from the boll such that the filaments wrap at least partially about the spindle 58. The individual spindles 58 will then pass from picking chamber 40 through their associated slot 56 through floor 54 into cotton collecting chamber 60, where the spindles will pass through associated doffers 62 in a manner such that the cotton filaments are removed from the spindles. The spindles will then be moistened by moistening pads associated with doffers 62 and pass upwardly through slots 56 back into chamber 40 for further picking. The spindles 58 and doffers 62 used can comprise, but are not limited to, the well known, conventional spindles and doffers, as described in more detail in Thedford et al., U.S. Pat. No. 5,038,552, the disclosure of which is hereby incorporated herein in its entirety by reference, including other patents referenced therein.

It can be envisioned that it is desired for conveying apparatus 42 to operate to convey a continuous flow or mat of cut plants CP through picking chamber 40 for picking by spindles 58 which are configured and operable to move across and through the flow in a manner to efficiently remove the cotton filaments from the cotton bolls present in the flow, without unduly interfering with or interrupting the flow, in a smooth, effective raking action, and will minimize likelihood of plants being caught, gathering in, or passing through slots 56 and entering cotton collecting chamber 60. To provide this capability, spindles 58 are preferably carried on at least one drum 64 disposed below floor 54 and picking chamber 40, in or just above cotton collecting chamber 60. Here, two side by side drums 64 are used, each supported for rotation about a rotational axis 66 through the drum, respectively. The rotational axes 66 are preferably oriented in or at a small angle to the direction of flow of cut plants CP through picking chamber 40, such that rotation of the drums 64 about rotational axes 66 will effect the desired cross movement or raking action of spindles 58 through chamber 40. Drums 64 are suitable supported for the rotation by bearings at the opposite axial ends thereof, and are rotatably driven by suitable drive or drives 68 (FIGS. 3 and 4), which can comprise hydraulic motors, electric motors, gear, chain, shaft, or belt drives.

Figure 5:
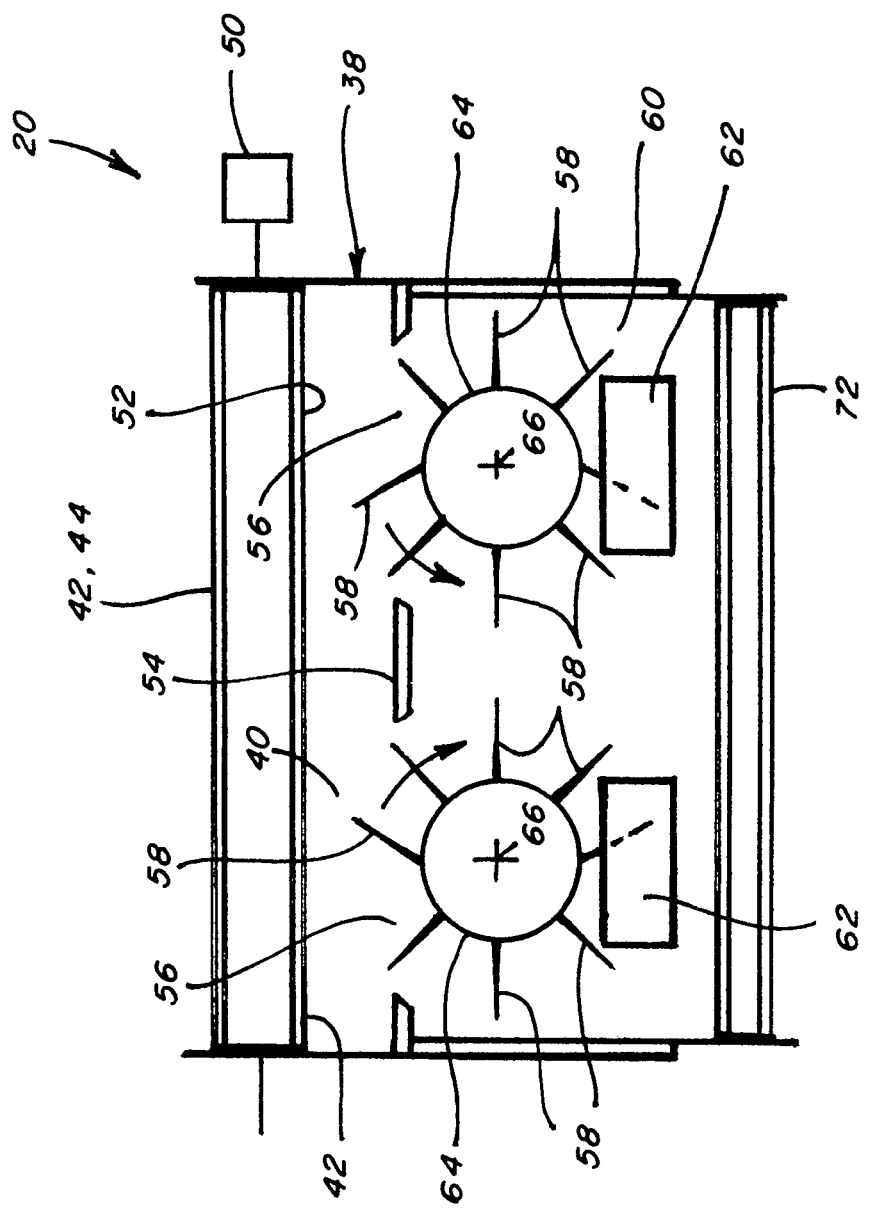
FIG. 5 is a simplified schematic end view of aspects of a picking chamber and associated aspects of the cotton picking and conveying apparatus.

Internally, drums 64 can include suitable mechanisms for rotating spindles 58 individually about rotational axes 70 extending longitudinally therethrough, and orienting the spindles for optimized picking and doffing, as best illustrated in FIG. 5. In this regard, spindles 58 include small barbs for grabbing and holding the cotton filaments, and the spindles preferably move through at least a substantial portion of their path through chamber oriented at a picking angle wherein the rotational axis 70 therethrough is directed slightly in the direction of cross movement of the spindle, to optimize picking.

Then, when doffed, the spindles are oriented at an opposite doffing angle that is slightly away from the direction of movement when in contact with doffers 62, to optimize doffing. A representative drum construction and internal mechanism for rotation and angular manipulation of cotton picking spindles for use in the present invention, is more fully described in Thedford et al., U.S. Pat. No. 5,038,55258 incorporated herein by reference above.

Cotton conveyor apparatus 72 is located in cotton collecting chamber 60, and is operable to convey the removed or doffed cotton C to a receiver, here, but not limited to, onboard module builder 22, while the cut plant residue CP passes above from picking chamber 40. Here, conveyor apparatus 72 comprises a mechanical belt, similar in construction to the belt 44 of apparatus 42 described above, movable in direction M for conveying the doffed cotton to a pneumatic system 74 including a blower (not shown) operable for generating an air flow 76 into and through one or more ducts 78 extending upwardly to module builder 22, for carrying an airborne flow of cotton C thereto, in the conventional, well known manner. Alternatively, it should be noted that a wide variety of different conveyor systems, mechanical and/or pneumatic, can be used for carrying the picked cotton to a receiver, and the receiver need not be located on harvester 20, or of a module builder type.

Figure 7:
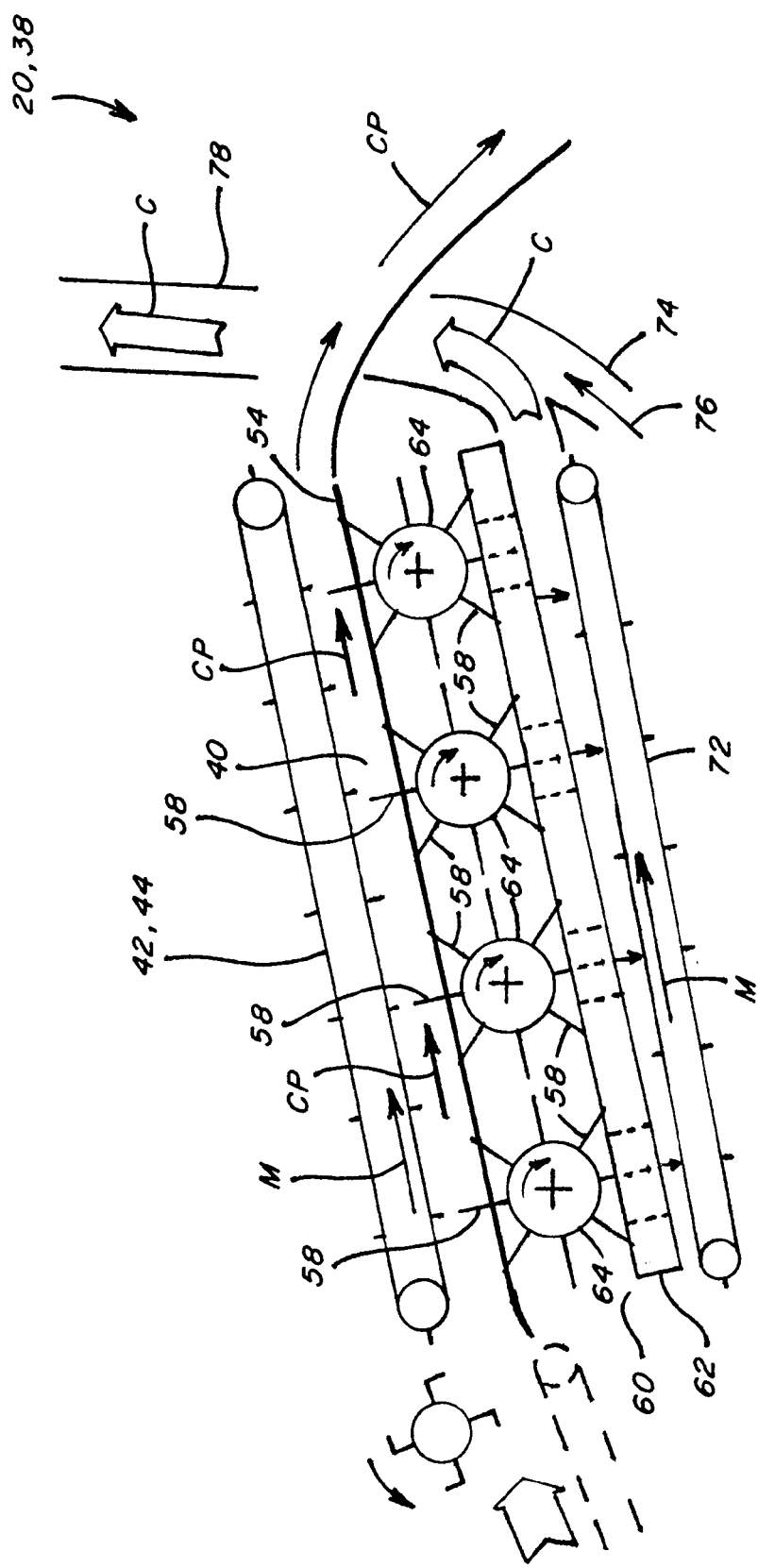
FIG. 7 is a simplified schematic side view of the picking chamber and aspects of an alternative embodiment of picking apparatus of the invention.

As an alternative embodiment, referring to FIG. 7, drum or drums 64 can be oriented so as to extend transverse to the direction of conveyance of cut plants CP through picking chamber 40. In this embodiment, plant conveying apparatus 42 including belt 44 will be constructed essentially as described above for conveying cut plants CP through picking chamber 40. Here, as a non-limiting example, four drums 64 carrying spindles 58 are illustrated, and will be rotated as indicated by arrows, at a speed determined to achieve desired picking characteristics. Doffers 62 and cotton conveyor apparatus 72 are located below picking chamber 40 and are operable in the above described manner for conveying picked cotton C to a pneumatic conveyor system 74 for conveyance through ducts 78 to a desired receiver.

As is evident from the above discussion, because the cotton is picked by apparatus separate of the conveying apparatus, sufficient relative motion between the bolls to be picked and the picking spindles is achieved. This, in combination with a row insensitive plant cutting capability allows faster travel over the ground and disconnection of picking speed and ground speed, to enable taking advantage of optimum picking conditions when present.

In light of all the foregoing, it should thus be apparent to those skilled in the art that there has been shown and described a cotton harvester that enables increasing picking speed to enable taking advantage of optimal conditions. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A cotton harvester, comprising:
    a cutting apparatus configured to sever cotton plants from a ground surface of a field;
    a plant conveyor apparatus configured to convey the severed plants through a picking chamber; and
    a picking apparatus comprising a plurality of spindles configured to move into the picking chamber and pick cotton filaments from bolls of the severed plants conveyed through the picking chamber and to carry the picked cotton into another area of the harvester, and doffers in the other area configured to remove the cotton from the plurality of spindles;

wherein the plant conveyor apparatus bounds and encloses an upper periphery of the picking chamber, the plurality of spindles extend upwardly through a surface that forms a lower periphery of at least a portion of the picking chamber, the plant conveyor apparatus is configured to cause the severed plants to flow in a first direction from an upstream end of the picking chamber to a downstream end of the picking chamber, and the plurality of spindles are configured to move through the picking chamber in a second direction transverse to the first direction.

2. The cotton harvester of claim 1, wherein the plurality of spindles extend upwardly through slots formed in the surface, wherein the slots are transverse to the first direction of flow of the severed plants through the picking chamber, thereby enabling the plurality of spindles to move through the picking chamber in the second direction.

3. The cotton harvester of claim 1 wherein the plant conveyor apparatus and a portion of the surface through which the plurality of spindles extend are positioned on opposite sides of the picking chamber and are configured to compress the severed plants into a mat when the severed plants are conveyed through the picking chamber between the plant conveyor apparatus and the portion of the surface.

4. The cotton harvester of claim 1, wherein the plurality of spindles are coupled to at least one drum disposed below the picking chamber and rotatable about a rotational axis through the at least one drum.

5. The cotton harvester of claim 4, comprising at least two of the drums.

6. The cotton harvester of claim 4, wherein the rotational axis is generally parallel to the first direction of flow of the severed plants through the picking chamber.

7. The cotton harvester of claim 5, wherein the drums are in side by side relation below the picking chamber.

8. The cotton harvester of claim 1, comprising a cotton collecting chamber below the picking chamber and configured to be positioned vertically between the picking chamber and the ground surface of the field as the cotton harvester moves in a forward direction of travel along the ground surface of the field.

9. The cotton harvester of claim 8, comprising a cotton conveyor apparatus disposed in the cotton collecting chamber.

10. The cotton harvester of claim 9, wherein the cotton conveyor apparatus is pneumatic.

11. The cotton harvester of claim 9, wherein the cotton conveyor apparatus is mechanical.

12. The cotton harvester of claim 8, wherein the other area of the harvester is located just above or partially in the cotton collecting chamber.

13. A cotton harvester, comprising:
a plant cutting apparatus configured to sever cotton plants from a ground surface;
a plant conveyor apparatus configured to convey the severed plants through a picking chamber, wherein the plant conveyor apparatus is positioned on a first side of the picking chamber and extends along a length of the picking chamber from an upstream portion to a downstream portion of the picking chamber;
a cotton picking apparatus comprising a plurality of spindles configured to move upwardly into the picking chamber to pick cotton filaments from bolls of the plants conveyed therethrough and carry the picked cotton downwardly from the picking chamber, and doffers located below the picking chamber configured to remove the cotton from the plurality of spindles, wherein the plurality of spindles extend into the picking chamber between the upstream portion and the downstream portion of the picking chamber; and
a cotton conveyor apparatus associated with the doffers configured to convey the removed cotton to a receiver.

14. The cotton harvester of claim 13, wherein the plurality of spindles extend upwardly through slots in a surface of the picking chamber, and the surface is positioned on a second side of the picking chamber and opposite the plant conveyor apparatus on the first side of the picking chamber.

15. The cotton harvester of claim 13, wherein the plurality of spindles are coupled to at least one drum disposed below the picking chamber and rotatable about a rotational axis through the at least one drum.

16. The cotton harvester of claim 15, comprising at least two of the drums.

17. The cotton harvester of claim 16, wherein the drums are in side by side relation below the picking chamber.

18. The cotton harvester of claim 13, wherein the plant conveyor apparatus is configured to facilitate flow of the severed plants in a first direction from the upstream portion of the picking chamber to the downstream portion of the picking chamber, and the plurality of spindles are configured to move through the picking chamber in a second direction transverse to the first direction.

19. The cotton harvester of claim 13, wherein the plant conveyor apparatus comprises a flat surface configured to contact the severed plants.

20. The cotton harvester of claim 14, wherein the slots extend in a transverse direction relative to a direction of flow of the severed plants through the picking chamber, and the slots are positioned at discrete locations spaced apart from one another along the length of the picking chamber between the upstream portion and the downstream portion of the picking chamber.

* * * * *